US010911512B2

(12) United States Patent
Nielsen et al.

(10) Patent No.: US 10,911,512 B2
(45) Date of Patent: Feb. 2, 2021

(54) PERSONALIZED CONTENT STREAMS USING ALIGNED ENCODED CONTENT SEGMENTS

(71) Applicant: Amazon Technologies, Inc., Seattle, WA (US)

(72) Inventors: Olaf Nielsen, Portland, OR (US); Evan Gerald Statton, Denver, CO (US)

(73) Assignee: Amazon Technologies, Inc., Seattle, WA (US)

( * ) Notice: Subject to any disclaimer, the term of this patent is extended or adjusted under 35 U.S.C. 154(b) by 274 days.

(21) Appl. No.: 15/696,065

(22) Filed: Sep. 5, 2017

(65) Prior Publication Data

US 2019/0075148 A1 Mar. 7, 2019

(51) Int. Cl.
*H04L 29/06* (2006.01)
*H04N 21/845* (2011.01)
*H04N 21/262* (2011.01)
*H04N 21/41* (2011.01)
*H04N 21/2668* (2011.01)
(Continued)

(52) U.S. Cl.
CPC .......... *H04L 65/607* (2013.01); *H04L 65/601* (2013.01); *H04N 21/21805* (2013.01);
(Continued)

(58) Field of Classification Search
None
See application file for complete search history.

(56) References Cited

U.S. PATENT DOCUMENTS 9,100,588 B1 * 8/2015 Seymour .............. H04N 5/2621
9,462,028 B1 * 10/2016 Levinson ................ H04L 63/08
(Continued)

FOREIGN PATENT DOCUMENTS

EP  2 880 866 A1  6/2015
EP    2880866 A1  6/2015
(Continued)

OTHER PUBLICATIONS

International Search Report for PCT Application No. PCT/US2018/047736 dated Oct. 16, 2018.
(Continued)

*Primary Examiner* — James A Edwards
(74) *Attorney, Agent, or Firm* — Knobbe, Martens, Olson & Bear, LLP

(57) ABSTRACT

Systems and methods are described to enable a personalized content stream whose content can be dynamically altered by a user, such that multiple underlying contents can seamlessly be included within the personalized content stream. Multiple input content streams are encoded to include time-aligned splice point frames, which break inter frame dependency before and after a given splice point frame. Time-aligned segments are then generated from the encoded streams. A user may thereafter select segments of any of the input content streams to be included within a personalized content stream, and an output device may decode segments generated from different input content streams as part of the personalized content stream, without errors being introduced into the content stream due to the segments stemming from different input content streams. Thus, as user may dynamically alter the content of a personalized content stream based on their preferences.

17 Claims, 9 Drawing Sheets

(51) Int. Cl.
*H04N 21/6587* (2011.01)
*H04N 21/218* (2011.01)
*H04N 21/472* (2011.01)
*G06F 3/0482* (2013.01)
*H04L 29/08* (2006.01)

(52) U.S. Cl.
CPC ... *H04N 21/2668* (2013.01); *H04N 21/26258* (2013.01); *H04N 21/4126* (2013.01); *H04N 21/47217* (2013.01); *H04N 21/6587* (2013.01); *H04N 21/8456* (2013.01); *G06F 3/0482* (2013.01); *H04L 29/06* (2013.01); *H04L 67/02* (2013.01)

(56) References Cited

U.S. PATENT DOCUMENTS

| | | |
|---|---|---|
| 2013/0326024 A1 | 12/2013 | Chen et al. |
| 2015/0181258 A1 | 6/2015 | Kim et al. |
| 2016/0182593 A1 | 6/2016 | Denoual et al. |
| 2016/0314819 A1* | 10/2016 | Elsner ............... G11B 27/34 |
| 2016/0344785 A1 | 11/2016 | Wang et al. |
| 2019/0208234 A1* | 7/2019 | Van Brandenburg ................. H04N 21/231 |

FOREIGN PATENT DOCUMENTS

| | | | | |
|---|---|---|---|---|
| GB | 2534136 | * | 7/2016 | ........... H04N 21/472 |
| GB | 2534136 A | | 7/2016 | |
| WO | WO 2019/050693 A1 | | 3/2019 | |

OTHER PUBLICATIONS

International Search Report and Written Opinion in PCT/US2018/047736 dated Oct. 16, 2018.
International Preliminary Report on Patentability in PCT/US2018/047736 dated Mar. 10, 2020.

* cited by examiner

PERSONALIZED CONTENT STREAMS USING ALIGNED ENCODED CONTENT SEGMENTS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

Service providers or content creators (such as businesses, artists, media distribution services, etc.) can employ interconnected computing devices (e.g., within data centers) to deliver content to users or clients. In some instances, these computing devices may support traditional content distribution systems, such as by creating, modifying, or distributing streaming television or radio content. In other instances, these computing devices may serve to replicate or replace prior content distribution systems. For example, data centers can provide network-based streaming audio or video content in a manner similar to traditional television or radio networks. This content is sometimes referred to as "internet television" or "internet radio," respectively. The content provided by these distribution systems (e.g., both traditional and computing network-based) may be pre-recorded, or live. Often, where computing devices are used to facilitate either traditional or network-based distribution systems, specialized software is used to replace or replicate functionality of dedicated hardware devices. For example, software applications may be used to encode and package a data stream containing live video content, thus reducing or eliminating the need for dedicated hardware to perform these functions. Because of the flexibility of software-based solutions, a single computing device may be utilized to generate content for both traditional and network-based generation systems.

DETAILED DESCRIPTION

Figure 1:
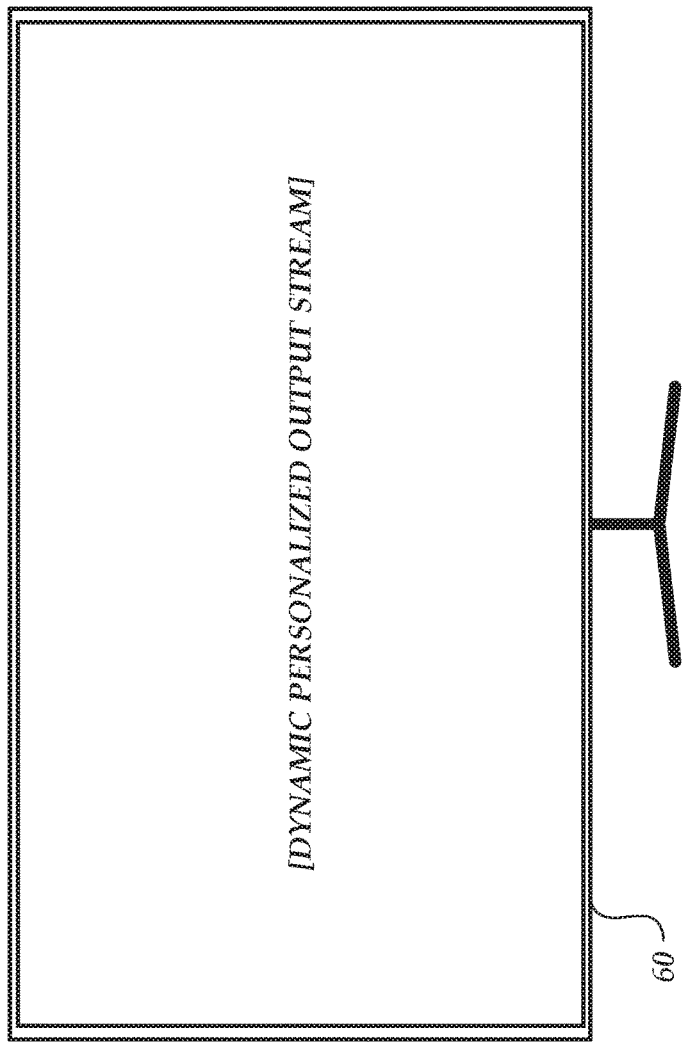
FIG. 1 is an illustration of a personalized content stream being output on an output device, and a view selection device that may be used to modify underlying content within the personized content stream.
Figure 1:
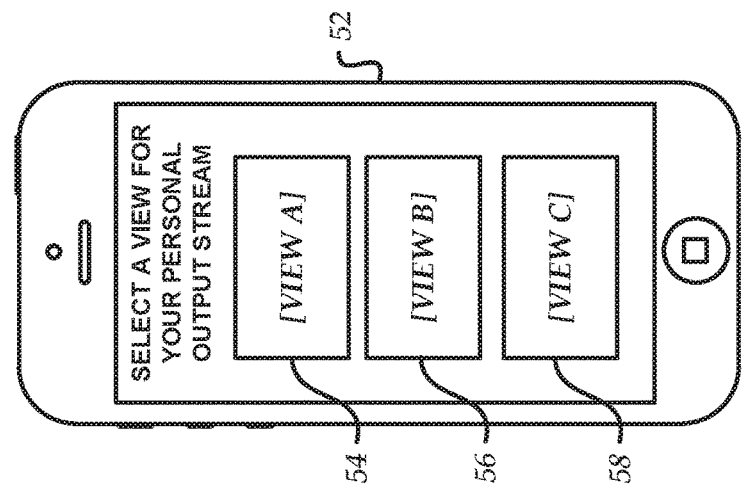

Generally described, aspects of the present disclosure relates to providing video streams that are dynamically customizable on a per-user basis, such that a user can alter what video content is included in the stream while the stream is ongoing, and such that changes in video content of a stream result in seamless playback at an output device. As described herein, streaming content can include any content that is continuously or repeatedly delivered to an output device during output of the stream. Streaming content can be compared to downloaded content, which generally requires obtaining the entirety of a content (e.g., a complete video file) before output of the content can begin. In one embodiment, streaming content is live content (e.g., being both recorded and presented in "real-time," which may include minor delays, such as to provide the ability for content censoring or filtering). The actual underlying content (e.g., video or audio content) within a stream is typically preselected and included in a stream by a provider of the stream. For example, a content provider (e.g., a streaming content service) may select to include a live event, such as sports match or concert, within a content stream. As such, while a viewer may be able to select from multiple different content streams (e.g., each including different content), the viewer is generally unable to modify the underlying content included within a stream. Moreover, switching a viewing device between different streams can negatively impact a viewing experience, as such switching is generally not seamless. Rather, the viewing device must generally obtain information regarding a new stream, retrieve one or more segments of the stream (e.g., into a buffer), and otherwise prepare for outputting of the new stream. This process can result in a substantial delay when switching streams, discouraging users from frequent stream switching. Such delays may be particularly problematic in instances where a user wishes to switch between multiple streams of related content, such as multiple different recordings of a live sports event (e.g., from the same or different content providers). Some embodiments of the present application addresses these and other problems by providing for content streams that are dynamically customizable on a per-user basis, such that a user can select the underlying content to be included within a content stream while the stream is ongoing. For example, in accordance with embodiments of the present disclosure, a user may begin consuming a stream that depicts a first view of a live event (e.g., a sports match), and during output of the stream, dynamically alter the content of the stream such that it depicts a second view of the live event. The stream may be personalized to the user, such that the alteration of the content does not necessarily affect streams provided to other users. Thus, each viewing of the live event can be enabled to dynamically alter their view of the event as shown within a personalized video stream. The stream may be provided by a streaming content delivery service that operates to alter the underlying content of a stream in a seamless manner, such that a viewing device is not required to switch streams or incur the delays typically required to switch streams. In some instances, the streaming content delivery service may modify or generate the underlying content such that the viewing device is not aware that any change has occurred with respect to the video stream. Moreover, the streaming content delivery service may provide personalized content streams to viewing users by dynamically recombining various different encoded contents, without being required to re-encode such content into each personalized stream. The computing resources required to provide personalized content streams can therefore be reduced or minimized. Thus, embodiments of the present disclosure provide for a resource-efficient streaming content delivery service that enable users to seamlessly alter the underlying content provided within a personalized content stream.

As an illustrative example, consider a live event, such as a sports match, in which a content provider (such as a video production company) films the event from multiple angles, resulting in multiple streams of content each corresponding to a different view. Typically, a director or other employee of the provider would determine which of the multiple views is included within a final output content stream at any given time, and the finalized output stream would then be provided to viewing users. The users may simply be unable to view the event from a different angle, or may be forced to switch to a different output stream (e.g., of a different provider) to do so, at which point they would be required to view the event from whatever angle was included within the different output stream. However, in accordance with embodiments of the present disclosure, a streaming content delivery system may make multiple views of such an event available simultaneously. For example, the streaming content delivery system may obtain three different content streams, each representing a filming of the event from a different angle, and make each such stream available to end users. Moreover, the streaming content delivery system may enable a user to mix and match segments for each content stream together to form a personalized content stream.

For example, with reference to FIG. 1, a user may view a personalized content stream on a viewing device 60, such as a television (which may represent, for example, a "smart" television with an integrated computing system, network interface, etc., or a non-computerized television with a network-connected computing device, such as a personal video player device, home theater computing device, or gaming console). The personalized content stream may be provided by a streaming content delivery system, and may initially depict a first view of a given event, such as a view of a baseball game from behind home plate. The user may further be associated with an input device 52, such as a computerized telephone or tablet computer, enabling the user to alter the view depicted on the viewing device 60, by dynamically altering the segments included within the personalized content stream. Illustratively, the input device 52 may depict a graphical user interface (e.g., as provided by an application executing on the input device 52), including elements 54-58, each of which provides a graphical representation of various views of the event made available on the personalized content stream. The graphical representation may include, for example, a low-resolution (e.g., "thumbnail") version of a content stream made available at the streaming content delivery system depicting a view of the event, or a periodically refreshing image (e.g., a screen capture) depicting the view of the event. Each element 54-58 may be selectable by a user to request that the personalized content stream, as output on the viewing device 60, be altered to depict a view corresponding to the selected element 54-58. Thus, by selecting element 54 on the input device 52, a user may cause the viewing device 60 to output a first view ("View A") of an event; by selecting element 56, a user may cause the viewing device 60 to output a second view ("View B") of the event; and by selecting element 58, a user may cause the viewing device 60 to output a third view ("View C") of the event. While graphical elements are depicted in FIG. 1 as selectable to modify a view, other inputs on the input device 52 may be used. For example, the input device 52 may include a gyroscope, such that a specific orientation of the device 52 causes a specific view to be selected. Thus, a user is enabled to dynamically select their view of the event. Moreover, rather than requiring a change in operation of the viewing device 60, the output of the viewing device 60 may be controlled at the streaming content delivery system, by dynamically altering the segments included within the personalized content stream as displayed on the viewing device 60. Thus, different views of the event can be seamlessly interchanged on the viewing device 60, without delays or interruptions typical of switching content streams.

In some embodiments, seamless interchanging of segments within a personalized content stream can be facilitated by synchronizing or aligning aspects of the content streams. For example, a streaming content delivery system can be configured to generate or modify segments of different input content streams (e.g., different views of an event) such that the segments contain specialized "splice point" frames at common locations across the different input content streams (e.g., at a common time). Splice point frames can represent specialized content frames that break the inter frame dependency of a content stream at a specific point, such that any subsequent frames may be decoded without reference to any frame prior to the splice point frame (and such that frames prior to the splice point frame may be decoded without reference to any frame subsequent to the splice point frame). One example of such a specialized content frame is the IDR frame, defined by the H.264 video encoding format, which format is known in the art. An IDR frame, when inserted into an H.264 compliant video stream, ensures that all subsequent frames of the video stream can be decoded without reference to any frame of the video stream prior to the IDR frame. By including splice point frames at common locations between segments of different input content streams, the streaming content delivery system can interchange different input content streams within an output content stream without disrupting decoding of the output content stream. For example, at a common splice point location between two input content streams, the streaming content delivery system halt including a first of the two input content streams in an output content stream, and begin including a second of the two input content streams in an output content stream. Because the splice point frames ensure no interframe dependency exists between frames of the two input content streams, a downstream decoding device will not experience decoding errors in the output content stream due to broken interframe dependencies. Example mechanisms for aligning splice point frames within different encoded content streams are described in more detail in U.S. patent application Ser. No. 15/614,345, entitled "OUTPUT SWITCHING FOR ENCODED CONTENT STREAMS," and filed Jun. 5, 2017 (the "'345 application"), the entirety of which is hereby incorporated by reference. In some instances, the streaming content delivery system may also cause other attributes of different encoded content streams to be aligned or synchronize. For example, the streaming content delivery system may align or synchronize timestamps or timecodes of encoded content streams representing input content streams, such that interchanging the input content streams within a personalized content stream results in no break in continuity of the timestamps or timecodes within the personalized content stream. Example mechanisms for aligning or synchronizing attributes of encoded content streams, such as timestamps or timecodes, are described in more detail in U.S. patent application Ser. No. 15/194,347, entitled "SYNCHRONIZATION OF MULTIPLE ENCODERS FOR STREAMING CONTENT" and filed Jun. 27, 2016 (the "'347 application"), the entirety of which is hereby incorporated by reference. When attributes of different input content streams are aligned or synchronized, it may not be apparent from the point of view of a viewing device outputting the personalized content stream that any interchanging of underlying content in the personalized content stream has occurred. Thus, the personalized content stream can allow for seamless transitions between different input content streams. Moreover, as will be described below, the input content streams may be handled by the streaming content delivery system in an encoded format, and interchanged within personalized content streams without requiring decoding or re-encoding of the input content streams. Thus, the streaming content delivery system can operate in a computationally efficient manner relative to a system that attempted to individually encode personalized content streams.

While example embodiments are described above with respect to input content streams that represent different views of a common event, some embodiments of the present disclosure may enable a personalized content stream to be generated based on input content streams representing different events or different types of content, such as different live events, television shows, etc. For example, a personalized content stream may be used as a personalized "channel," which provides a stream of content selected by a user from among a variety of television shows, movies, fan-made content, etc. Moreover, while examples may be discussed with respect to video content, embodiments of the present disclosure may in some instances enable personalized content streams including other types of content, such as audio content. For example, different input audio streams may be intermixed within personalized content streams by altering the underlying input audio streams at encoder boundary points (EBPs) within the audio streams, which points partition an audio stream into segments, such that segments of different audio streams may be intermixed within a personalized content stream without introducing errors into the personalized content stream. Thus, the examples provided herein are intended to be illustrative in nature.

As will be appreciated by one of skill in the art in light of the present disclosure, the embodiments disclosed herein improves the ability of computing systems, such as content streaming systems, to deliver content to users. Specifically, aspects of the present disclosure improve the ability of content streaming systems to provide customized content streams on a per-user basis, and to dynamically and seamless alter what encoded content is included within a as an input to an output content stream, without introducing errors into the output content stream and without requiring decoding or reencoding of the input content streams. Moreover, the presently disclosed embodiments address technical problems inherent within computing systems; specifically, the limited ability of computing devices to transmit information, the limited ability of computing devices to decode and encode content, and the inherent errors that occur when attempting to combine encoded information under prior systems. These technical problems are addressed by the various technical solutions described herein, including the generation of personalized content streams by selective inclusion in the personalized content stream of different segments of input content streams, each segment being seamlessly interchangeable with other segments.

The foregoing aspects and many of the attendant advantages of the present disclosure will become more readily appreciated as the same become better understood by reference to the following, when taken in conjunction with the accompanying drawings.

Figure 2:
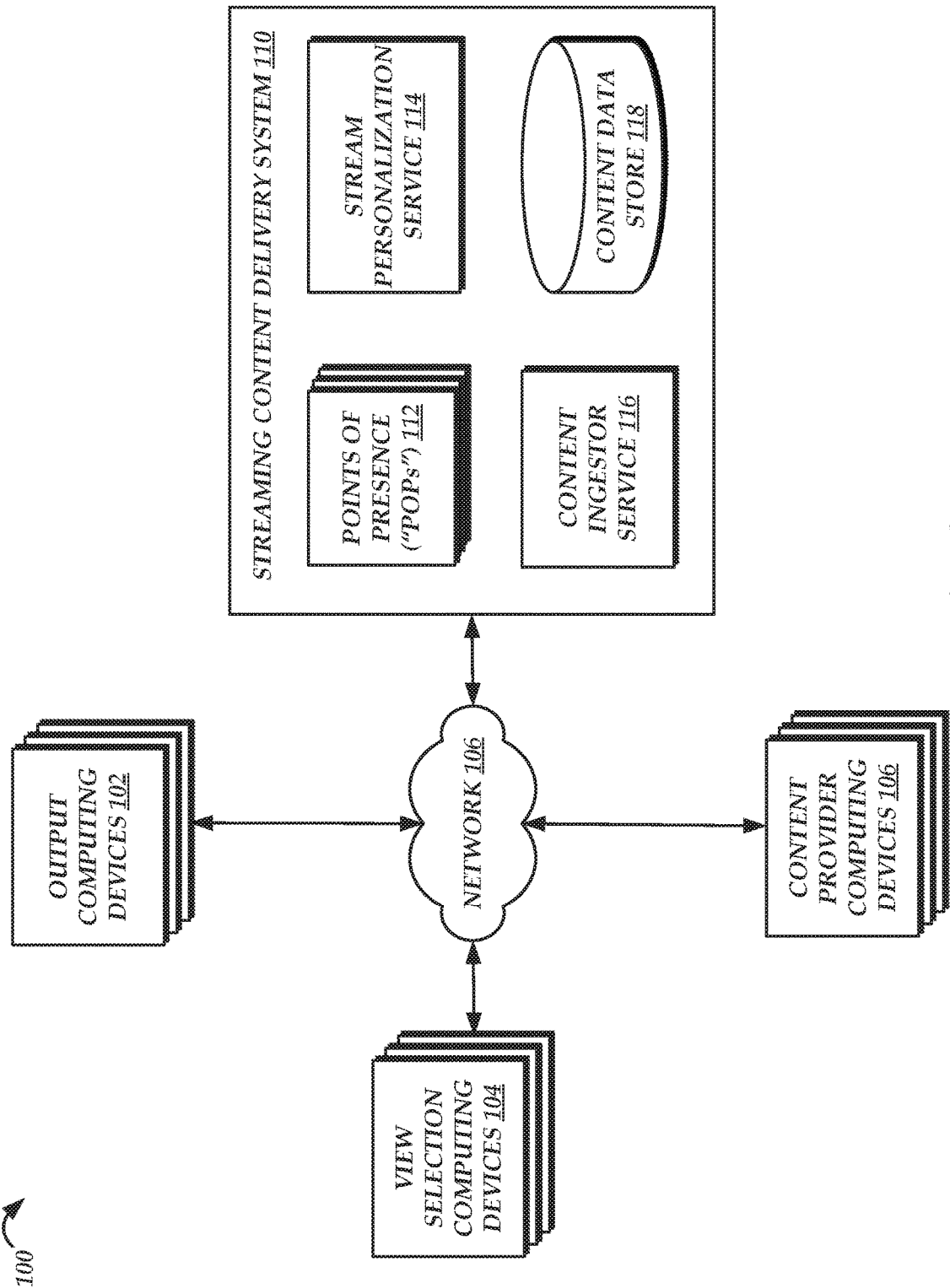
FIG. 2 is a block diagram depicting an illustrative logical environment in which a streaming content delivery system may operate to provide personalized content stream according to some embodiments of the present disclosure.

FIG. 2 is a block diagram depicting an illustrative environment 100 including multiple content provider computing devices 108, output computing devices 102, view selection computing devices 104, and a streaming content delivery system 110 in communication via a network 106. While the content provider computing devices 108, output computing devices 102, and view selection computing devices 104 are shown as grouped within FIG. 2, the content provider computing devices 108, output computing devices 102, and view selection computing devices 104 may be geographically distant, and independently owned or operated. For example, the output computing devices 102 and view selection computing devices 104 could be used by a multitude of users in various global, continental, or regional locations accessing the streaming content delivery system 110. Further, the content provider computing devices 104 could represent a multitude of related or distinct parties that have associated with the streaming content delivery system 110 to provide streaming content the client computing devices 102. Accordingly, the groupings of content provider computing devices 108, output computing devices 102, and view selection computing devices 104 within FIG. 1 is intended to represent a logical, rather than physical, grouping. Similarly, each of the components of the streaming content delivery system 110 may be located within geographically diverse areas. For example, the streaming content delivery system 110 can contain points of presence ("POPs") 112 at a variety of globally, continentally, or regionally distinct locations, in order to provide a wide geographical presence for the streaming content delivery system 110. While shown as distinct, two or more of the content provider computing devices 108, output computing devices 102, view selection computing devices 104, and streaming content delivery system 110 may be operated by a common entity, or by a common computing device. In some instances, two or more of the content provider computing devices 108, output computing devices 102, and view selection computing devices 104 may represent a single physical device. For example, a single physical computing device can operate as both an output computing devices 102 to output a personalized content stream, and as a view selection computing device 104 to select a view represented within the personalized content stream.

Network 106 may be any wired network, wireless network, or combination thereof. In addition, the network 106 may be a personal area network, local area network, wide area network, cable network, satellite network, cellular telephone network, or combination thereof. In the example environment of FIG. 2, network 106 is a global area network (GAN), such as the Internet. Protocols and components for communicating via the other aforementioned types of communication networks are well known to those skilled in the art of computer communications and thus, need not be described in more detail herein. While each of the content provider computing devices 108, output computing devices 102, view selection computing devices 104, and streaming content delivery system 110 is depicted as having a single connection to the network 106, individual components of the content provider computing devices 108, output computing devices 102, view selection computing devices 104, and streaming content delivery system 110 may be connected to the network 106 at disparate points. Accordingly, communication times and capabilities may vary between the components of FIG. 2.

Output computing devices 102 may include any number of different computing devices capable of outputting streaming content provided by the streaming content delivery system 110. For example, individual output computing devices 102 may correspond to a laptop or tablet computer, personal computer, wearable computer, server, personal digital assistant (PDA), hybrid PDA/mobile phone, mobile phone, electronic book reader, set-top box, camera, digital media player, and the like. Each output computing device 102 may include hardware and/or software enabling the reception and output of streaming content, including dedicated playback hardware, dedicated software (e.g., specially programmed applications), and general purpose software (e.g., web browsers) capable of outputting streaming content (e.g., by downloading the content directly, downloading a web page including the content, etc.).

Similarly, the view selection computing devices may include any number of different computing devices capable of communicating with the streaming content delivery system 110 in order to notify the streaming content delivery system 110 of content that is desired by a user to be included within a personalized content stream. For example, individual view selection computing devices 102 may correspond to a laptop or tablet computer, personal computer, wearable computer, server, personal digital assistant (PDA), hybrid PDA/mobile phone, mobile phone, electronic book reader, set-top box, camera, digital media player, and the like. In one embodiment, the view selection computing device 102 includes hardware and/or software enabling the reception and output of a user interface enabling selection from among multiple contents that can be included in a personalized content stream. Such software may include, for example, specially programmed applications or web browsers capable of outputting the graphical user interface. In another embodiment, the view selection computing device 102 includes a dedicated interface, such as a number of physical buttons, enabling selection from among multiple contents that can be included in a personalized content stream. In still other embodiments, other inputs of a view selection computing device 102 may be used to enable selection of multiple contents. For example, a gyroscope within the view selection computing device 102 may enable view selection based on an orientation of the device 102 in real space.

Content providers computing devices 104 may include any computing device owned or operated by an entity that provides content to the streaming content delivery system 110 for subsequent transmission within content streams to the output computing devices (which may include one or more client computing devices 102). For example, individual content providers computing devices 104 may correspond to a laptop or tablet computer, personal computer, wearable computer, server, personal digital assistant (PDA), hybrid PDA/mobile phone, mobile phone, electronic book reader, set-top box, camera, digital media player, and the like. Content providers computing devices 104 may include servers hosting streaming audio, video, text, multimedia, or other encoded content. In some instances, content providers computing devices 104 may be associated with recording equipment, such as cameras, recording a live event. The content provider computing devices 108 may transmit content to the streaming content delivery system 110 over the network in either encoded or un-encoded (e.g., "raw") format. In some embodiments, the content provider computing devices 108 may be operated by individual users. For example, the content provider computing devices 108 may correspond to client computing devices that execute software to record a current program, such as a video game, being displayed at the client computing device, and to transmit the recording of the program to the streaming content delivery system.

The streaming content delivery system 110 can include a variety of components and devices configured to enable output computing devices 102 to access streaming content provided to the streaming content delivery system 110 by the content provider computing devices 104. Specifically, the streaming content delivery system 110 can include a number of POPs 112 configured to host streaming content, or act as a caching point for streaming content hosted by the streaming content delivery system 110. Each POP 112 may include a variety of computing devices configured to serve content to output computing devices 102. Accordingly, each POP 112 may include any number of processors, data stores, or networking components operating in conjunction to facilitate retrieval and delivery of streaming content to output computing devices 102. The POPs 112 may communicate with other components of the streaming content delivery system 110 via an internal network of that system 110, which may include any wired network, wireless network, or combination thereof, and may be a personal area network, local area network, wide area network, cable network, satellite network, cellular telephone network, or combination thereof. In some instances, the internal network may be implemented at least in part by the network 106 (e.g., as a virtual private network, or "VPN"). Illustratively, each POP 112 may function to hold a limited selection of content segments within a local cache data store (e.g., the mostly recently requested n content segments), such that these content segments can be quickly transmitted to output computing devices 102. When the local cache data store does not include a requested content segments, the POP 112 can be configured to retrieve the content segments from a remote data store, such as a content data store 118 of the streaming content delivery system 110 or a data store within a system of a content provider 104 (not show in FIG. 1), and return the content segments to a requesting output computing device 102.

In accordance with embodiments of the present disclosure, the streaming content delivery system 110 can include a content ingestor service 116 configured to receive input content streams from content provider computing devices 108, to modify the content of the streams if necessary to enable seamless interchanging of portions of the input content streams into personalized output content streams, and to store the content within the content data store 118, which data store 118 may correspond to any persistent or substantially persistent data storage, such as a hard drive (HDD), a solid state drive (SDD), network attached storage (NAS), a tape drive, or any combination thereof. Illustratively, the content ingestor service 116 may include one or more content encoders configured to receive content, such as a content stream, from a content provider computing device 108 and to encode or re-encode the content into one or more encodings suitable for delivery to output computing devices 102. For example, the content ingestor service 116 may receive a content stream from a content provider computing device 108 at a relatively high quality, and re-encode the content into a variety of relatively lower quality content streams (e.g., 'HD' quality, 'SD' quality, etc.) for delivery to output computing devices. The ingestor service 116 may further include a content packager computing device configured to package encoded content into segments suitable for transmission to output computing devices 102 within a personalized content stream. Further details regarding operation of such encoding and packaging computing devices are discussed in the '345 application and '347 application, both of which are incorporated by reference above.

The streaming content delivery system 110 can further include a stream personalization service 114 configured to provide personalized content streams to output computing devices 102 based on segments of input content streams stored (e.g., as stored within the content data store 118). While operation of the stream personalization service 114 is described in more detail below, the stream personalization service 114 can generally operate to select segments from one or more input contents or content streams for inclusion in a personalized content stream, and to provide an output computing device 102 with information enabling the device 102 to retrieve the selected segments from the streaming content delivery system 110 (e.g., via interaction with a POP 112). In one embodiment, information provided to the output computing devices 102 includes a manifest file that reference segments to be included with the personalized content stream, such as a manifest file generated in accordance with the Hypertext Transport Protocol ("HTTP") Live Streaming ("HLS") protocol or a Media Presentation Description (MPD) file generated in accordance with the MPEG Dynamic Adaptive Streaming over HTTP ("MPEG-DASH") protocol. Manifests of either protocol may be generated in compliance with the Common Media Application Format (CMAF) standard. Thus, by use of the references within such a manifest file, an output computing device 102 may retrieve content segments from a POP 112 in order to form a personalized content stream. As discussed in more detail below, the stream personalization service 114 can be configured to dynamically select segments to be included within a personalized content stream based on view selection information provided by the view selection computing devices 104, thus enabling users to interact with the view selection computing devices 104 to modify the underlying content within a personalized content stream.

It will be appreciated by those skilled in the art that the streaming content delivery system 110 may have fewer or greater components than are illustrated in FIG. 2. In addition, the streaming content delivery system 110 could include various web services and/or peer-to-peer network configurations. Thus, the depiction of the streaming content delivery system 110 in FIG. 2 should be taken as illustrative. For example, in some embodiments, components of the streaming content delivery system 110, such as the stream personalization service 114 or the content ingestor service 116, may be executed by one more virtual machines implemented in a hosted computing environment. A hosted computing environment may include one or more rapidly provisioned and released computing resources, which computing resources may include computing, networking and/or storage devices. A hosted computing environment may also be referred to as a cloud computing environment.

Figure 3:
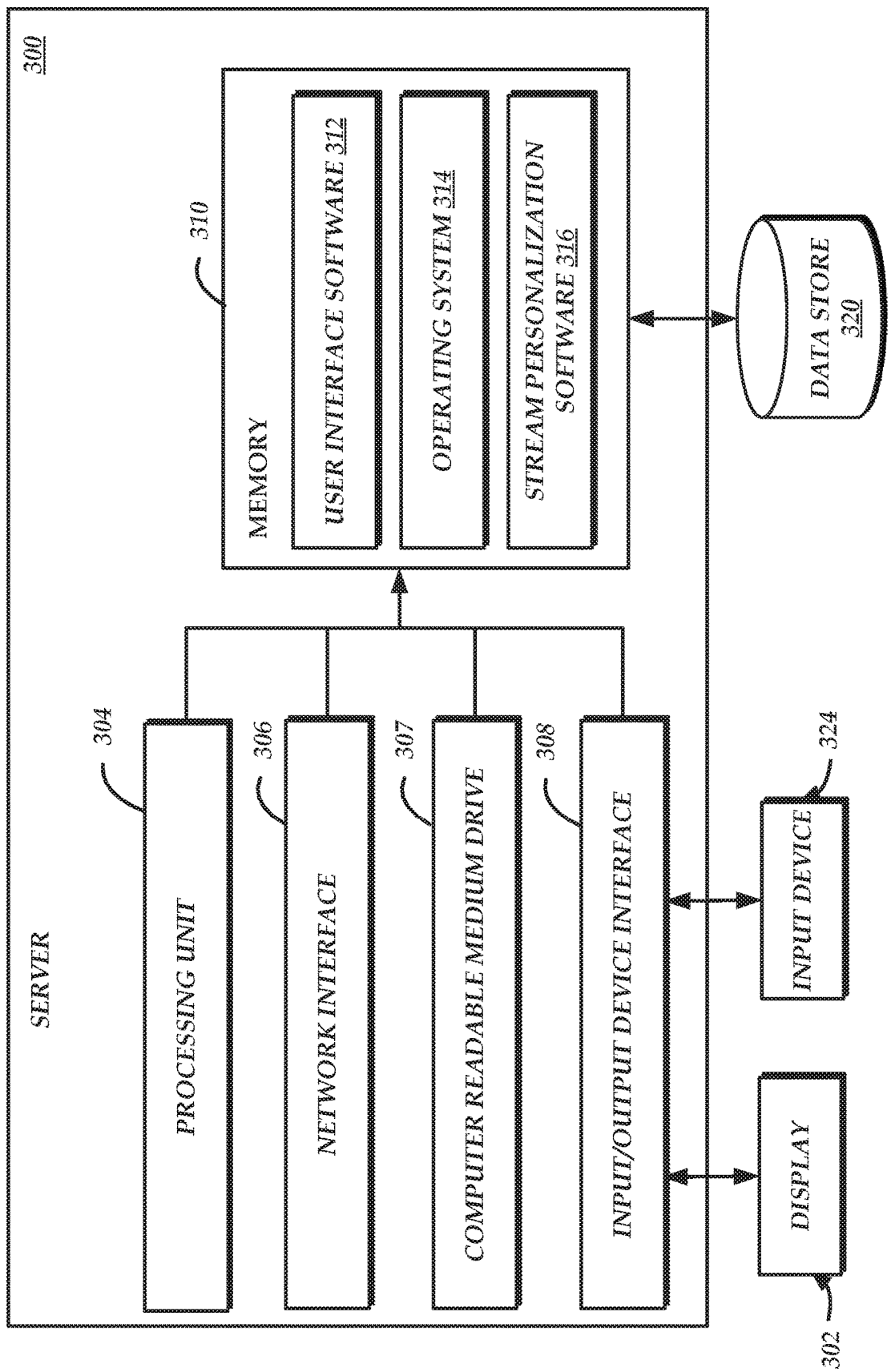
FIG. 3 is a block diagram depicting an illustrative configuration of one embodiment of a server than may implement elements of the streaming content delivery system of FIG. 1.

FIG. 3 depicts one embodiment of an architecture of a server 300 that may implement one or more of the elements of the streaming content delivery system 110, such as the stream personalization service 114. The general architecture of server 300 depicted in FIG. 3 includes an arrangement of computer hardware and software components that may be used to implement aspects of the present disclosure. As illustrated, the server 300 includes a processing unit 304, a network interface 306, a computer readable medium drive 307, an input/output device interface 320, a display 302, and an input device 324, all of which may communicate with one another by way of a communication bus. The network interface 306 may provide connectivity to one or more networks or computing systems, such as the network 106 of FIG. 2. The processing unit 304 may thus receive information and instructions from other computing systems or services via a network. The processing unit 304 may also communicate to and from memory 310 and further provide output information for an optional display 302 via the input/output device interface 320. The input/output device interface 320 may also accept input from the optional input device 324, such as a keyboard, mouse, digital pen, etc. In some embodiments, the server 300 may include more (or fewer) components than those shown in FIG. 3. For example, some embodiments of the server 300 may omit the display 302 and input device 324, while providing input/output capabilities through one or more alternative communication channel (e.g., via the network interface 306).

The memory 310 may include computer program instructions that the processing unit 304 executes in order to implement one or more embodiments. The memory 310 generally includes RAM, ROM, and/or other persistent or non-transitory memory. The memory 310 may store an operating system 314 that provides computer program instructions for use by the processing unit 304 in the general administration and operation of the server 300. The memory 310 may further include computer program instructions and other information for implementing aspects of the present disclosure. For example, in one embodiment, the memory 310 includes user interface software 312 that generates user interfaces (and/or instructions therefor) for display upon a computing device, e.g., via a navigation interface such as a web browser installed on the computing device. In addition, memory 310 may include or communicate with one or more auxiliary data stores, such as data store 320, which may correspond to any persistent or substantially persistent data storage, such as a hard drive (HDD), a solid state drive (SDD), network attached storage (NAS), a tape drive, or any combination thereof.

In addition to the user interface module 312, the memory 310 may include stream personalization software 316 that may be executed by the processing unit 304. In one embodiment, the stream personalization software 316 implements various aspects of the present disclosure, e.g., selecting segments to be included within a personalized content stream based on view selection information provided by a user, and providing to an output content device 103 a manifest file or other information enabling the device 103 to retrieve the selected segments to output the personalized content stream. While the stream personalization software 316 is shown in FIG. 3 as part of the server 300, in other embodiments, all or a portion of the software may be implemented by alternative computing devices within the streaming content delivery system 110, such as virtual computing devices within a hosted computing environment. Moreover, while FIG. 3 is described with respect to software implementing the stream personalization service 114, the software within the memory 310 may additionally or alternatively include instructions to implement other components of the present disclosure, such as the content ingestor service 116.

Figure 4:
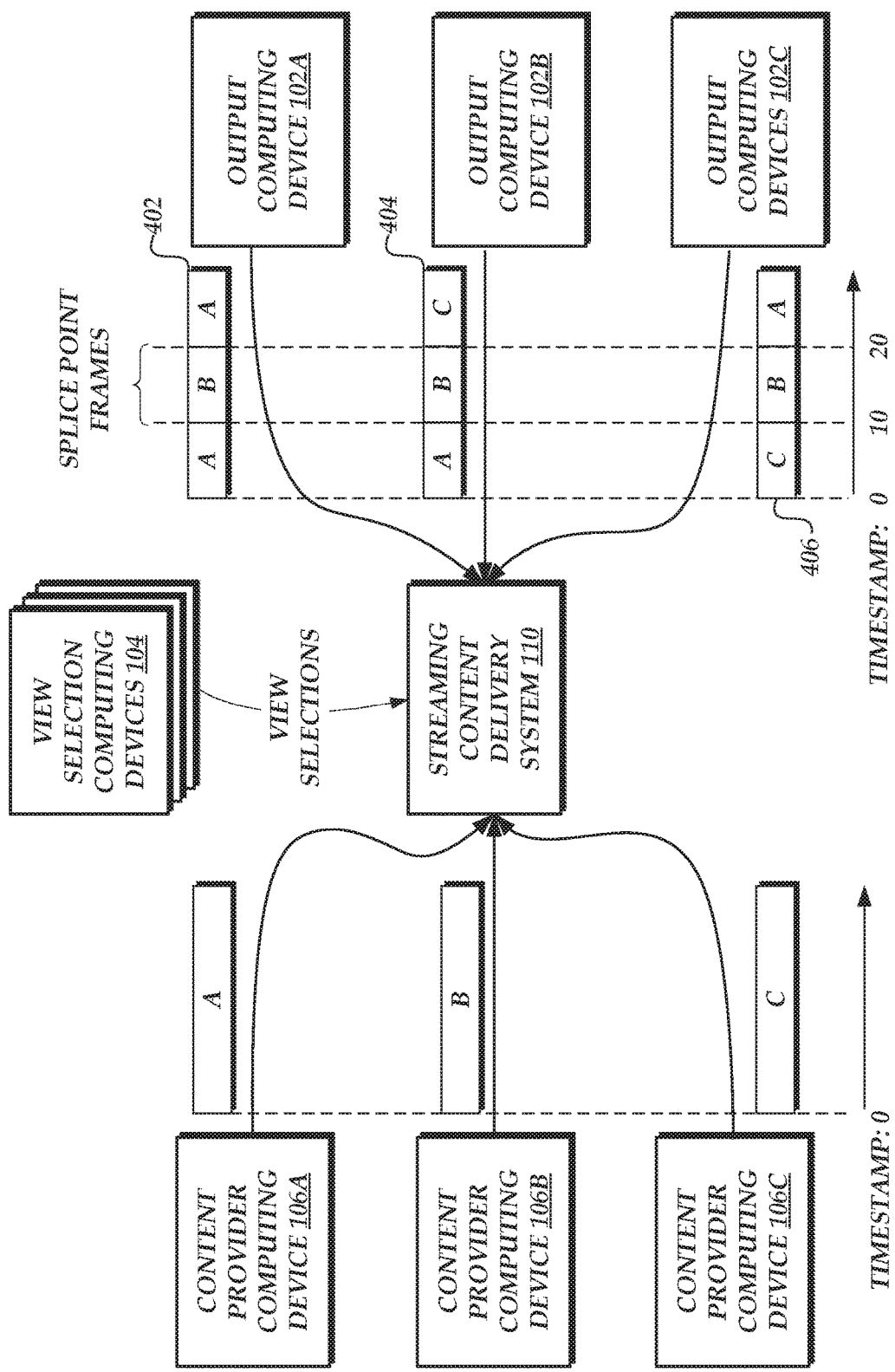
FIG. 4 is an illustrative visualization of multiple personalized content streams that may be provided by the streaming content delivery system of FIG. 1 to different output computing devices, based on input streams representing multiple underlying contents.

With respect to FIG. 4, an illustrative example is shown in which three content provider computing devices 108A-C each provide a respective input video content stream, labeled as video streams A, B, and C respective. Each video content stream may represent a different view of a common live event, or may represent distinct live events. For example, each video content stream may represent the feed of a different camera at a single sports match, or each video content stream may represent a recording of a different sports match. For ease of description, each of the video content streams is shown at beginning at a common timestamp (of zero). However, a common timestamp need not exist between the video content streams.

Each video content stream is received at the streaming content delivery system 110, where the streams are altered or modified as required to enable seamless interchange of segments of the input video content streams within personalized content streams. For example, a content ingestor service 116 may re-encode the input video content streams into one or more encoded streams of a format suitable for display on output computing devices 102A (e.g., a variety of bitrates, resolutions, etc.). Furthermore, the content ingestor service 116 may, during encoding, synchronize or align aspects of the encoded streams to enable interchangeable presentation of portions of the encoded streams. Further discussion regarding alignment or synchronization of content streams is provided below with reference to FIG. 5.

Thereafter, the streaming content delivery system 110 can utilize different combinations of segments generated from each input video content stream to provide a variety of personalized output streams to output computing devices 102A, and may alter the segments within each personalized output stream based on information received from a view selection computing devices 104. For example, the streaming content delivery system 110 may provide a first personalized content stream 402 to a first output computing device 102A, which includes segments representing content of the first input video content stream (stream A) from timestamps 0 through 10, followed by segments representing content of the second input video content stream (stream B) from timestamps 10 through 20, and then again followed by segments representing content of the first input video content stream from timestamps 20 through 30. These segments may represent, for example, an initial user selection, on a view selection computing device 104 associated with the output computing device 102A, of a view represented by the first input video content stream, followed by selection of a view represented by the second input video content stream at just prior to timestamp 10, and again followed by selection of the view represented by the first input video content stream at timestamp 20. The streaming content delivery system 110 may provide similar personalized output streams 404 and 406 to other output computing devices 102 (shown as output computing devices 102B and 102C), based on inputs from other view selection computing devices 104 associated with the respective output computing devices 102.

A shown in FIG. 4, transition points in a personalized content stream between different underlying contents (e.g., representing the various input content streams A-C) can correspond to locations of splice point frames within the segments representing the different underlying contents. Thus, inclusion of these different segments within a personalized content stream is unlikely to result in interframe dependency errors when playing back the output content stream on an output computing device 102A. As will be described in more detail below, the streaming content delivery system 110 may in some instances delay modifying the underlying content within a personalized content stream from a first underlying content to a second underlying content until a common location in the two underlying contents is reached. For example, where a request is received from a view selection computing device 104 to switch the personalized content stream 402 from including the input content stream A to including the input content stream B, the streaming content delivery system 110 may delay switching what input content stream is included within the personalized content stream 402 until timestamp 10, which may represent a next location of a common splice point frame between the two input content streams. In other instances, such as where the streaming content delivery system 110 determines that a common splice point frame will not occur within a threshold period of time, the streaming content delivery system 110 may cause a new splice point frame to be included at a common location within encoded contents corresponding to the input content streams, to facilitate more rapid interchange of underlying content within the personalized content stream 402. Example mechanisms for selective insertion of splice point frames are discussed in more detail within the '345 application, incorporated by reference above.

Figure 5:
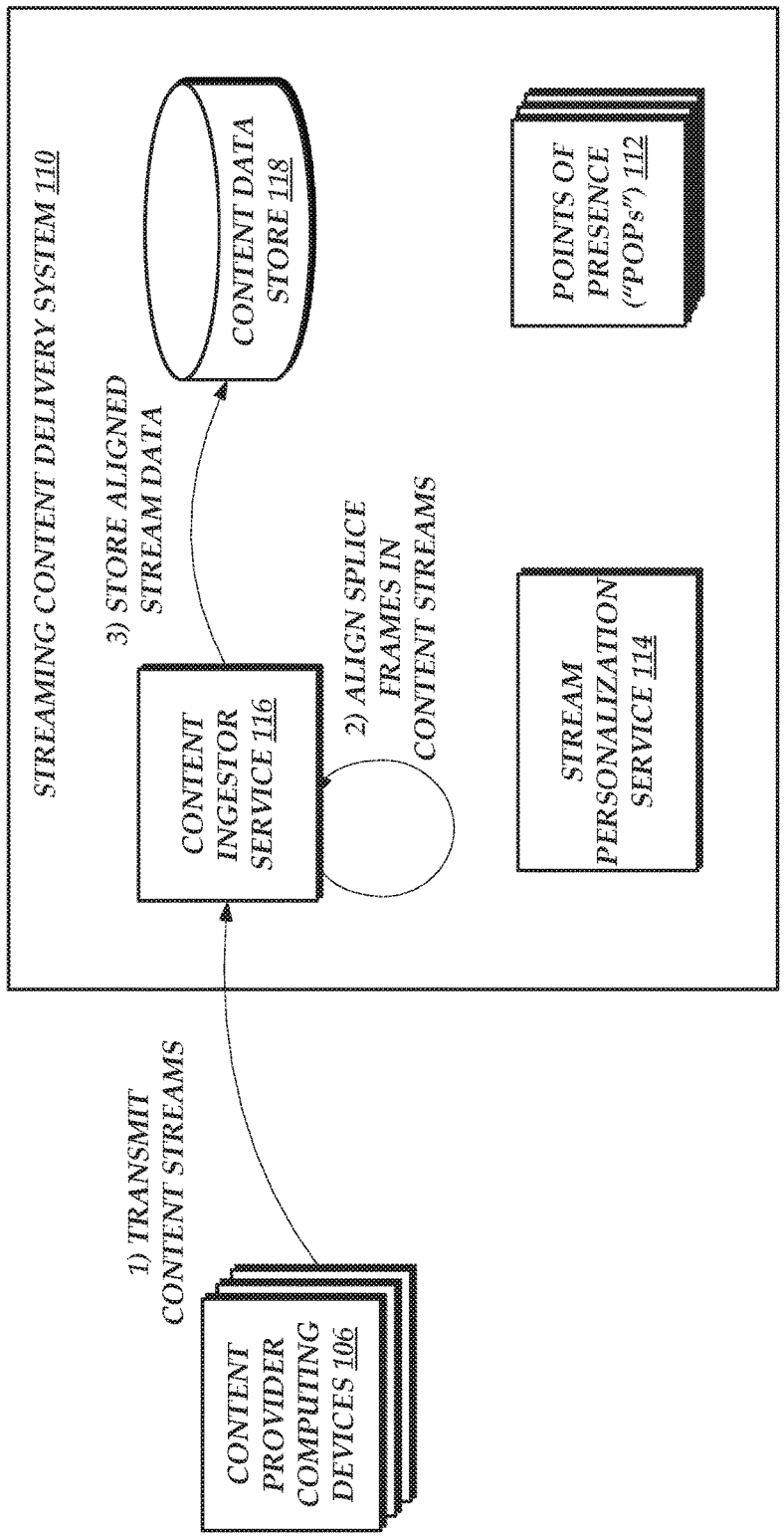
FIG. 5 is a block diagram depicting illustrative interactions for processing input streams representing multiple underlying contents at the streaming content delivery system of FIG. 1 to enable mixing of segments of the underlying contents within a personalized content stream.

With reference to FIG. 5, illustrative interactions will be described for processing a set of content streams received from one or more content provider computing devices 108 into aligned content segments, which may be dynamically selected for inclusion within a personalized content stream. The interactions begin at (1), where the content provider computing devices 108 transmit the content streams to the content ingestor service 116. Illustratively, the content streams may be transmitted via the network 106 in any suitable format, such as the MPEG-TS streaming content format. In one embodiment, each content stream is transmitted in a common format. In another embodiment, two or more of the content streams are transmitted in different formats. As noted above, the content streams may represent a variety of different types of underlying content. For example, the content streams may represent different angles of filming at a live event, or represent recordings of different events. In one embodiment, the content streams represent screen captures of displays of different computing devices participating in a common activity, such as different screen captures of players participating in a multiplayer network-based video game. While FIG. 5 is described with reference to content streams from content provider computing devices 108, embodiments of the present disclosure could also be applied to non-streaming content. For example, content provider computing devices 108 may transmit pre-recorded content to the content ingestor service 116 for processing in accordance with the embodiments described herein.

At (2), the content ingestor service 116 processes the input content streams to align splice point frames within the content streams, such that different portions of the different input content streams may be included in a common output content stream without introducing errors in the output content stream due to broken interframe dependency. Illustratively, the content ingestor service 116 may insert splice point frames at common locations within the encoded streams, in accordance with embodiments of the '345 application, incorporated by reference above, or may synchronize other attributes, such as timestamps or timecodes of the encoded streams, in accordance with embodiments of the '347 application, also incorporated by reference above. The content ingestor service 116 may encode the input content streams into any number of known formats, including but not limited to H.263, H.264, H.265, MICROSOFT SMPTE 421M (also known as VC-1), APPLE™ ProRes, APPLE Intermediate Codec, VP3 through 9, Motion JPEG ("M-JPEG"), MPEG-2 part 2, RealVideo, Dirac, Theora, and MPEG-4 Part 2 (for video), and Vorbis, Opus, MP3, advanced audio coding ("AAC"), pulse-code modulation ("PCM"), dedicated to sound ("DTS"), MPEG-1, audio coding 3 ("AC-3"), free lossless audio codec ("FLAC"), and RealAudio (for audio), or combinations thereof. Various techniques for encoding content are known within the art, and therefore will not be described in greater detail herein. The content ingestor service 116 may further package the encoded streams into any container format suitable for inclusion within a personalized content stream. As will be recognized by one of skill in the art, a container format may generally combine encoded audio and video into a file, potentially along with synchronization information for the audio and video, subtitles, metadata, or other information. Examples of containers include, but are not limited to, Matroska, FLV, MPEG-4 Part 12, VOB, Ogg, Audio Video Interleave ("AVI"), Quicktime, Advanced Systems Format ("ASF"), RealMedia, ISO Base Media File Format (ISOBMFF), fragmented MP4 (fMP4), and MPEG Transport Stream ("MPEG-TS"). In one illustrative embodiment, the content ingestor service 116 encoded each content stream according to the H.264 video encoding standard, and packages each stream into a number of MPEG-TS file, which files may represent segments of the encoded streams includable in a personalized content stream. In one embodiment, the segments of each content stream may be time-aligned, such that each nth segment of each content stream begins at a common time (e.g., a common timestamp), and ends at a common time. Time alignment of segments can facilitate intermixing of segments of different input content stream into a personalized content stream, as discussed below. Furthermore, in some instances, segments of each content stream may be packaged to begin at a splice point frame within the content stream. Because the streaming content delivery system 110 may be configured to alter the underlying content within a personalized content stream at a point corresponding to a detected splice point frame within segments of both underlying contents (e.g., a content prior to the alteration and a content after the alteration), generating segments that begin with splice point frames can enable underlying content within a personalized content stream to be altered by combining segments of the different underlying contents.

At (3), the content ingestor service 116 stores the aligned stream data (e.g., a collection of segments representing each of the input content streams, and including underlying content with aligned splice point frames) into the content data store 118. The segment corresponding to different input content streams (e.g., representing different underlying content) may thereafter be selectively included within a personalized content stream, in accordance with the embodiments described herein.

Figure 6A:
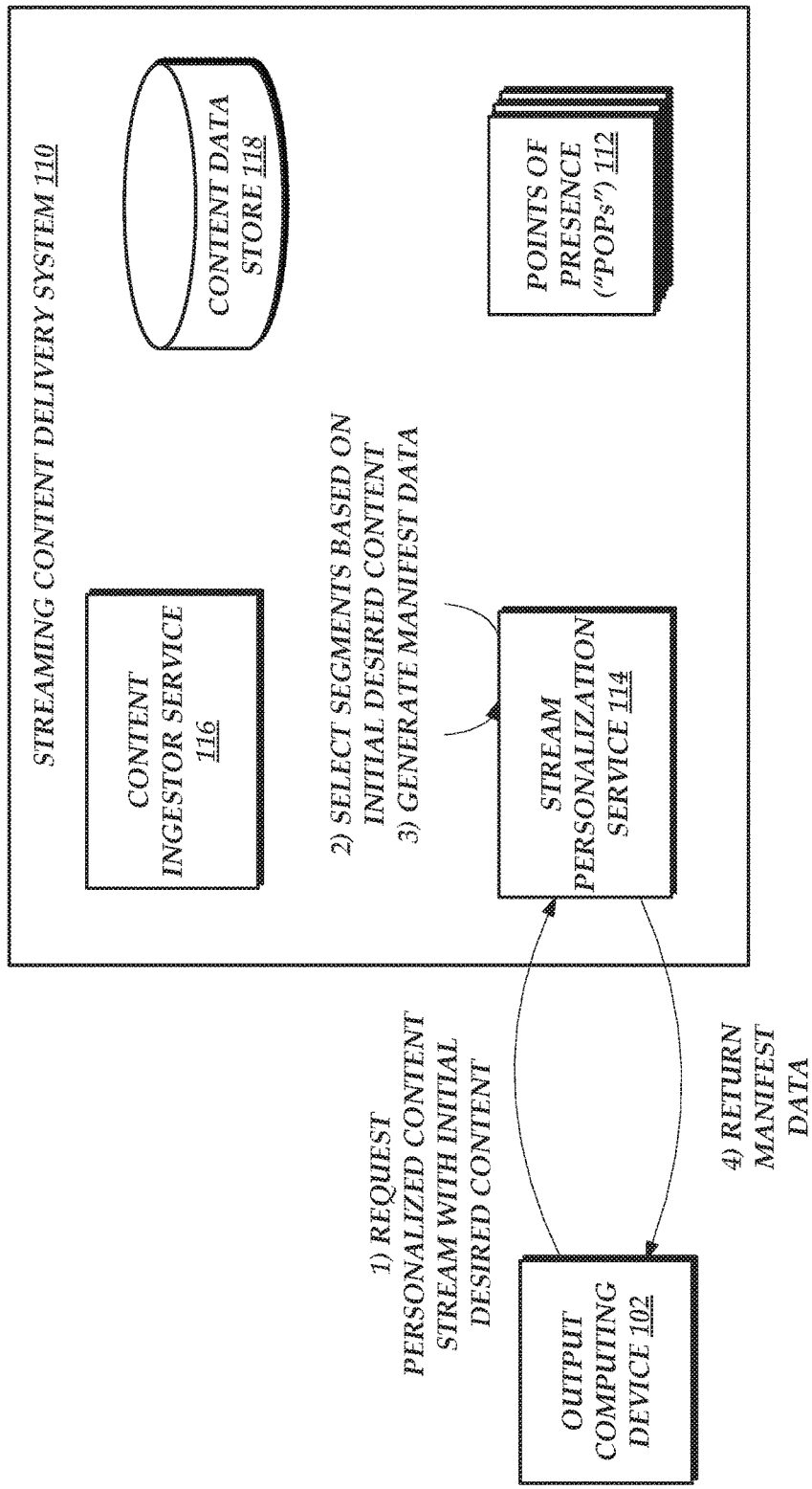
FIGS. 6A-6C are block diagrams depicting illustrative interactions with the streaming content delivery system of FIG. 1 to provide a personalized content stream to an output device.
Figure 6B:
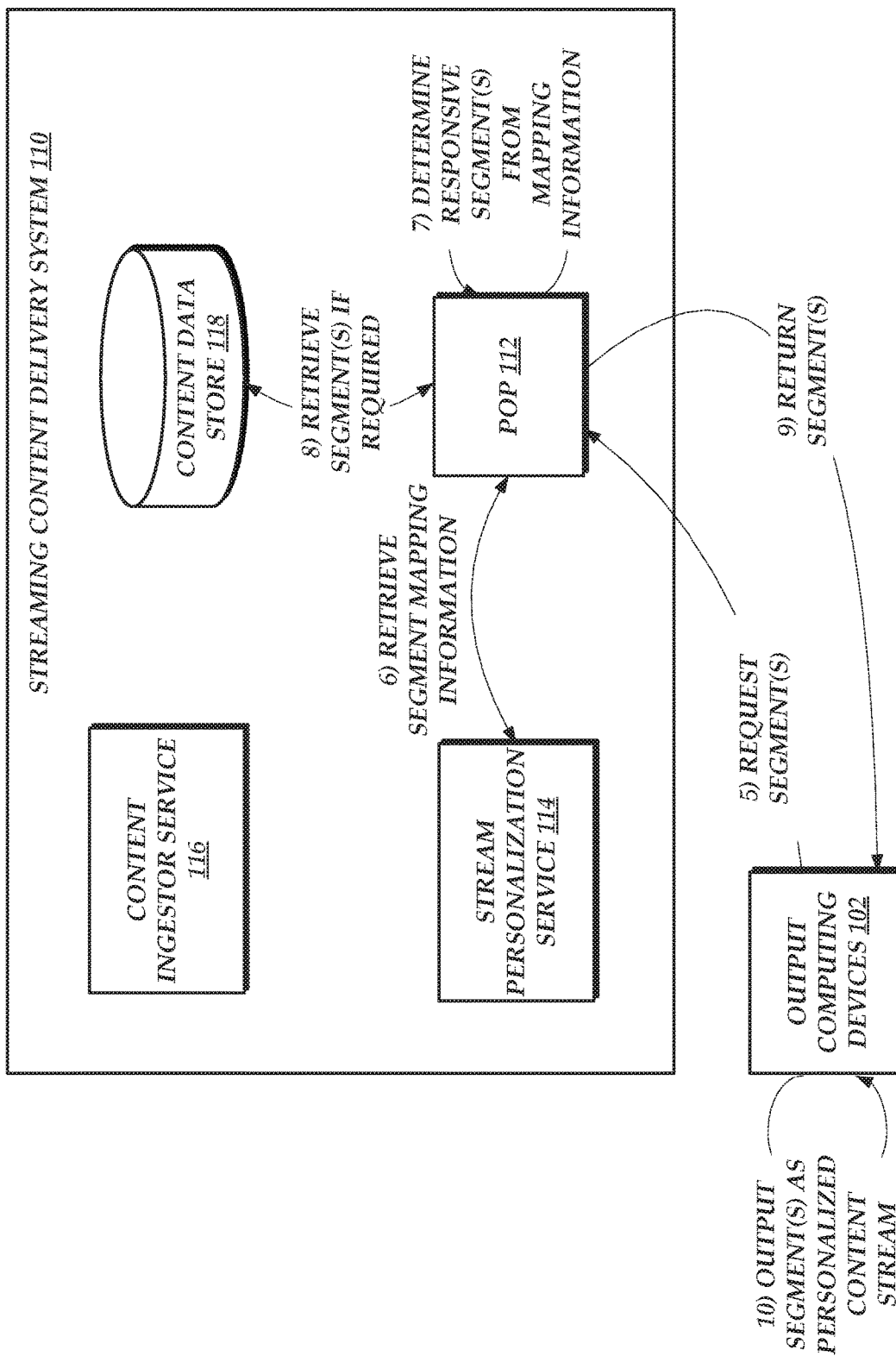
Figure 6C:
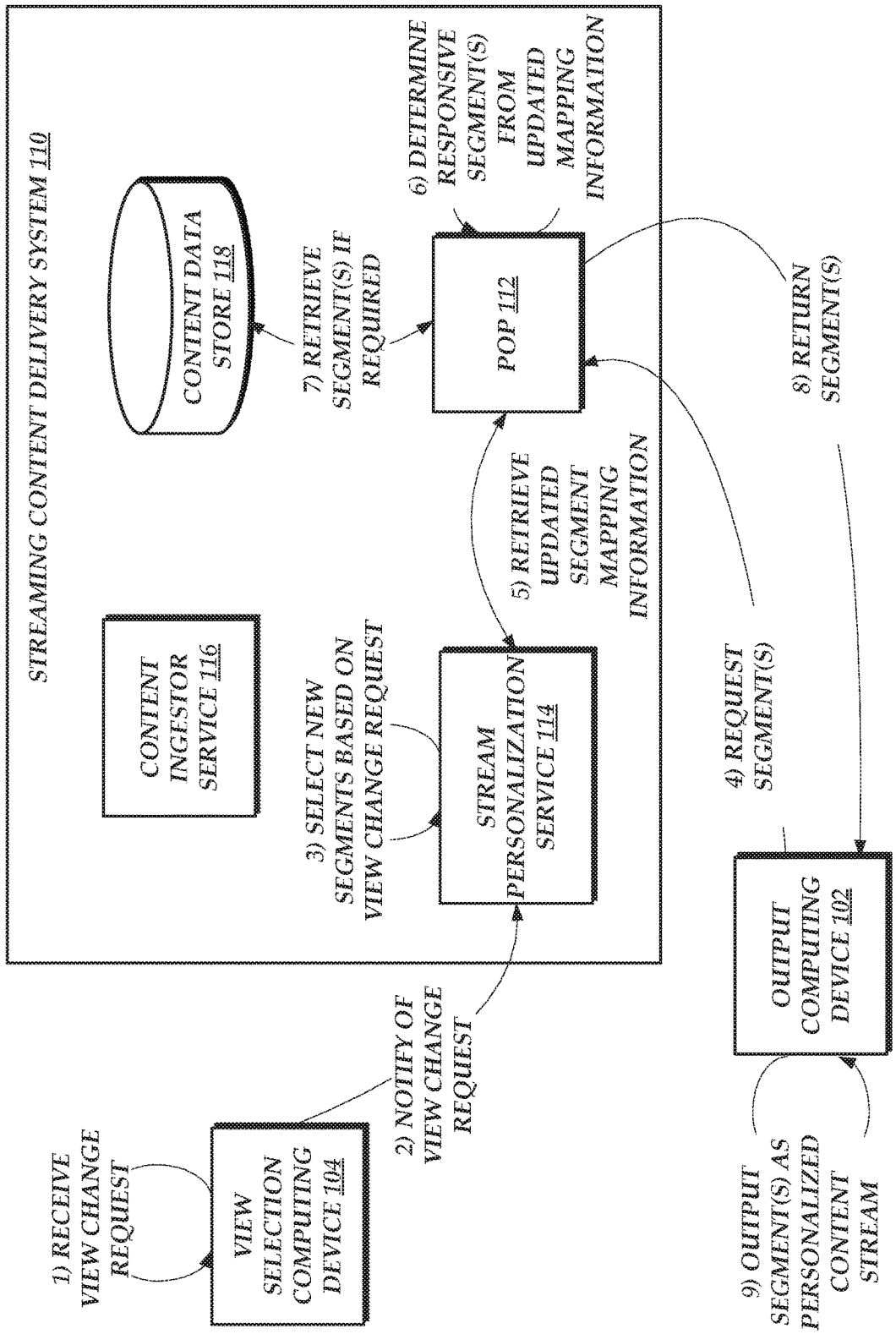

With reference to FIGS. 6A-C, illustrative interactions will be described for providing a personalized content stream to an output computing device 102. Specifically, interactions will be described with reference to FIGS. 6A and 6B for providing an personalized content stream to an output computing device 102 including segments representing a first underlying content (e.g., content of a first input content stream), while interactions will be described with reference to FIG. 6C for dynamically altering the segments of the personalized content stream, such that segments of a second underlying content (e.g., content of a second input content stream) are included within the personalized content stream. Thus, via the interactions of FIG. 6A-C, a user is enabled to interact with the streaming content delivery system 110 to dynamically interchange underlying content within a personalized content stream.

The interactions of FIG. 6A begin at (1), where an output computing device 102 requests a personalized content stream. Such a request may be generated, for example, by user interaction with the output computing device 102 to select the personalized content stream (e.g., via an interface of the output computing device 102). The request may indicate an initial content desired to be included within the personalized content stream, such as a first view of a live event made available on the streaming content delivery system 110.

At (2), the stream personalization service 114 selects segments to be included in the personalized content stream. The segments may correspond, for example, to segments generated by the content ingestor service 116 from an input content stream corresponding to the initial desired content, and stored by the content ingestor service 116 in the content data store.

At (3), the stream personalization service 114 generates manifest data for the personalized content stream. The manifest data may represent an initial portion of a manifest file for the personalized content stream. As noted above, the manifest file generally includes a reference to a number of content segments that collectively represent the personalized content stream. The manifest file may be repeatedly updated or appended during the personalized content stream to reflect new segments to be included within the content stream. For example, the initial manifest data generated by the stream personalization service 114 may list the first 10 segments of a content stream, and the stream personalization service 114 may later update the manifest data to include a next 10 segments of a content stream, etc. In some instances, a manifest file may reflect only a limited number of segments around a current output position of a content stream, and thus correspond to a "moving window" of segments within the content stream. In other instances, the manifest file may maintain references to historical segments of a content stream, and thus be similar to a "log" of all segments within the content stream. As noted above, the manifest file may represent a manifest file generated in accordance with the Hypertext Transport Protocol ("HTTP") Live Streaming ("HLS") protocol or a Media Presentation Description (MPD) file generated in accordance with the MPEG Dynamic Adaptive Streaming over HTTP ("MPEG-DASH") protocol.

In one embodiment, the manifest data (e.g., representing an initial portion of a manifest file), includes one or more references to segments included within the content data store 118 or otherwise made available at the streaming content delivery system 110. The references may take the form, for example, of a uniform resource locator, or "URI." Thus, when the initial desired content represents an "input stream A," the manifest data may include a series of references in the form of "http://example.tld/segments/in_stream_A/segment_<n>.ts", where "<n>" represents an integer ordering of segments generated from the input stream A. In some instances the manifest data may include multiple references for each segment of the personalized content stream. For example, the manifest data may reference multiple versions of a first segment of a given input stream, each in varying resolutions, bitrates, or formats.

In another embodiment, rather than including direct references to segments of an input content stream, manifest data may instead include "generic" or "placeholder" references. Such references may not have a direct correspondence to a segment within the content data store 118, but instead represent a placeholder reference (such as a placeholder reference in the form of a uniform resource locator, or "URI") that the streaming content delivery system 110 can later associate with a segment in the content data store 118. For example, a manifest file may include a sequential number of references in the form of "http://example.tldkpersonal_stream_id>/<n>.ts", where "<personal_stream_id>" represents an identifier of the personalized content stream, and "<n>" represents an integer ordering of a segment within the personalized content stream. To enable later resolution of placeholder references, the stream personalization service 114 may further determine a mapping of each placeholder reference to a segment of an input content stream (e.g., as stored within the content data store 118). For example, the stream personalization service 114 may determine that reference "http://example.tldkpersonal_stream_id>/1.ts" corresponds to "http://example.tld/segments/in_stream_A/segment 1.ts", that "http://example.tldkpersonal_stream_id>/2.ts" corresponds to "http://example.tld/segments/in_stream_A/segment_2.ts", etc. As will be discussed in more detail below, use of placeholder references in manifest data may enable the streaming content delivery system 110 to more rapidly modify the segments included within a personalized content stream, as the streaming content delivery system 110 may alter the mapping even after the manifest data is transmitted to the output computing device 102.

Thereafter, the manifest data is transmitted to the output computing device 102, at (4). By retrieving and playing back the segments referenced within the manifest data, and output computing device 102 may output the personalized content stream (e.g., including segments of the initially desired content), as will be described below. While a limited number of interactions are shown in FIG. 6A, these interactions may be repeated any number of times during output of a personalized content stream. For example, the output computing device 102 may continuously or repeatedly interact with the stream personalization service 114 to retrieve additional manifest data, such that the output computing device 102 can continue to retrieve and output segments of the personalized content stream.

The interactions of FIG. 6A are continued in FIG. 6B, where the output computing device 102 utilizes the manifest data as discussed above to retrieve one or more segments of a personalized content stream, and to playback those segments, thus outputting the personalized content stream. Specifically, at (5), the output computing device 102 transmits a request to a POP 112 for one or more segments referenced within the manifest data (e.g., by submitting a HTTP GET request to the URI corresponding to the segment in the manifest data). As discussed above, in some instances, the manifest data may include generic or placeholder references, which do not directly correspond to files stored within the content data store 118. As such, at (5), the POP 112 can interact with the stream personalization service 114 to resolve a placeholder identifier (e.g., as identified within the request) into an identifier of a segment of an input content stream. For example, the POP 112 may transmit a request to the stream personalization service 114 to resolve a given placeholder identifier into an identifier of a segment of an input content stream. The stream personalization service 114 may then utilize mapping information (e.g., as generated in accordance with the interactions of FIG. 6A, discussed above), to return to the POP 112 an identifier of a segment of an input content stream. In some instances, rather than requiring a request from the POP 112, the stream personalization service 114 may "push" mapping information to one or more POPs 112, such that the POPs 112 are not required to retrieve mapping information in response to a request. In embodiments where placeholder references are not utilized, the request can directly identify a segment of an input content stream, and thus, interaction (6) may not be required.

At (8), the POP 112 retrieves the determined segment of the input content stream from the content data store 118, if required. Illustratively, to reduce network communications between the POP 112 and the content data store 118, the POP 112 may maintain a local cache of recently requested segments. As such, if the determined segment of the input content stream has previously been cached at the POP 112, interaction (8) may not be required. Otherwise, the POP 112 at interaction (8) may retrieve the determined segment of the input content stream from the content data store 118.

At interaction (9), the requested segments are returned to the output computing device 102. Thereafter, the output computing device 102 can output the segments as part of a personalized content stream. Thus, in accordance with the interactions of FIGS. 6A and 6B, a user utilizing an output computing device 102 is enabled to output a personalized content stream including a desired underlying content.

With reference to FIG. 6C, illustrative interactions for dynamically altering the segments within a personalized content stream will be described. Specifically, the interactions of FIG. 6C can enable a user, using a view selection computing device 104, to request that the segments included within a personalized content stream be altered, and further enable the streaming content delivery system 110 to alter the segments within the personalized content stream without introducing errors into the stream, such that different underlying contents can be seamless displayed within the personalized content stream. For ease of references, the interactions of FIG. 6C are renumbered to begin at (1). However, it should be understood that the interactions of FIG. 6C may occur at any time during output of a personalized content stream.

The interactions of FIG. 6C begin at (1), where the view selection computing device 104 receives a request (e.g., from user input) to change the view within the personalized content stream to a different underlying content (e.g., a different view of the same live event, a view of a different live event, etc.). The request may be received, for example, by user selection of the elements 54-58 of FIG. 1.

At (2), the view selection computing device 104 transmits a notification to the stream personalization service 114 of the requested view. The notification may be transmitted, for example, by code executing on the view selection computing device 104 (e.g., a browser application or specialized view selection application).

At (3), the stream personalization service 114 selects new segments of underlying content to be included within the personalized content stream, based on the new view change request. The new segments may correspond to segments representing the underlying content selected by virtue of the view change request. Thereafter, the stream personalization service 114 causes the new segments to be included within the personalized content stream, thus altering the content of the personalized content stream to reflect the underlying content selected in the view change request. Because the segments of the new underlying content include splice point frames aligned to the segments of the prior underlying content, the segments may be intermixed within the output content stream without introducing errors into the content stream.

In embodiments where the manifest data provided to the output computing device 102 directly references segments existing in the content data store 118, the stream personalization service 114 may cause the newly selected segments to be referenced within any additional manifest data transmitted to the output computing device 102. Thus, as the personalized content stream continues, and as the output computing device 102 continues to receive manifest data for the personalized content stream, the output computing device 102 will (after the view change request is received at the view selection computing device 104) begin to obtain manifest data referencing new segments dynamically selected by the stream personalization service 114. By processing of that manifest data, the output computing device 102 will begin to output segments of the newly selected underlying content, thus altering the underlying content output to a user, without requiring the output computing device 102 to stop outputting the personalized content stream or otherwise alter content streams.

As noted above, in some embodiments the stream personalization service 114 may provide the output computing device 102 with manifest data including placeholder references, and the POPs 112 may utilize placeholder-to-segment mapping to resolve requests to receive segments from an output computing device 102. The use of placeholder references can be beneficial, for example, in that it may enable the streaming content delivery system to modify the segments provided to a device based on requests for segments, rather than based on delivery of manifest data. Because requests for segments occur based on processing a manifest file, the use of placeholder segments can therefore enable later determination of the segments provided to an output computing device 102, and may increase the observed responsiveness of the personalized content stream to view change requests. For the purposes of further discussion of FIG. 6C, it will be assumed that the stream personalization service 114 provides manifest data with placeholder references to segments. Accordingly, when selecting new segments based on the view change request, the stream personalization service 114 may update a placeholder-to-segment mapping to reflect a mapping of placeholder references to segments of the new underlying content. For example, where a prior placeholder-to-segment mapping mapped placeholder n to segment n of a first underlying content, the stream personalization service may update the mapping to map placeholder n to segment n of a second underlying content. The mapping may be updated to replace references to the first underlying content with references to the second underlying content, from a change location determined by the stream personalization service 114. The change location be selected by the stream personalization service 114 based on identifying locations corresponding to splice point frames within both the first underlying content and the second underlying content. Illustratively, the stream personalization service 114 may select the change location by determining a next segment corresponding to both the first underlying content that has not yet been retrieved by the output computing device 102, and replacing a reference in the mapping to that and subsequent segments with references to corresponding segments of the second underlying content. Thus, at the next time that the output computing device 102 requests a segment of the personalized content stream, the streaming content delivery system 110 may cause a segment of the second underlying content to be delivered to the output computing device 102. In instances where direct references to segments are included within manifest data, the change location may be selected as a next segment of the first underlying content not yet referenced in manifest data transmitted to the output computing device 102.

Thereafter, the output computing device 102 may request one or more segments (e.g., based on processing references within manifest data previously provided by the stream personalization service 114), at (4). The POP 112, in turn, may retrieve updated segment mapping information from the stream personalization service 114, determine the segments identified by the mapping, retrieve the segments from the content data store 118 as required, and return the segments to the output computing device 102, at interactions (4)-(8). These interactions are similar to interactions (5)-(9) of FIG. 6B, and are thus description of the interactions is not repeated. Thereafter, at (9), the output computing device 102 outputs the segments as part of the personalized content stream, thus altering the underlying content output to a user, without requiring the output computing device 102 to stop outputting the personalized content stream or otherwise alter content streams.

While the interactions of FIG. 6A-6C are described above with respect to segments stored within the content data store 118 (e.g., representing content packaged into a file), the interactions may in some instances occur with respect to segments generated dynamically by a POP 112 in response to a user request. For example, where the stream personalization service 114 utilizes placeholder references within a manifest file, the stream personalization service may generate a mapping of placeholder references to portions of one or more underlying contents desired to be included within the segment (e.g., a range of timestamps of one or more input content streams to be included in the content). The POP 112 may then generate a segment to be delivered to the output computing device 102, based on the portion of underlying content in the mapping. For example, each POP 112 may include a packager computing device configured to dynamically generate a segment by packaging a portion of an input content stream (e.g., received from the content ingestor service 116) based on a portion of an underlying content indicated in a mapping provided by the stream personalization service 114. In some instances, the POP 112 may dynamically generate a segment only where an appropriate segment does not already exist within the POP 112, such that if a segment with a given underlying content is to be delivered to multiple output computing devices 102, the POP 112 can reuse a previously generated segment for second and subsequent requests. In one embodiment, the POP 112 may dynamically generate each segment by packaging portions of one or more input content streams. In another embodiment, the POP 112 may dynamically generate only segments including different underlying contents in a single segment. For example, the POP 112 may maintain a different set of segments for each input content stream, but be configured to dynamically create segments that include portions of different input content streams. Thus, if the stream personalization service 114 determines that a segment should include two different input content streams (e.g., 2 seconds of a first input content stream and 2 seconds of a second input content stream), the POP 112 may dynamically generate that segment based on the two input content streams, and return the dynamically generated segment to the output computing device 102. Thus, the POP 112 may in various instances act as a packager of input content streams into segments to be included within a personalized content stream.

Figure 7:
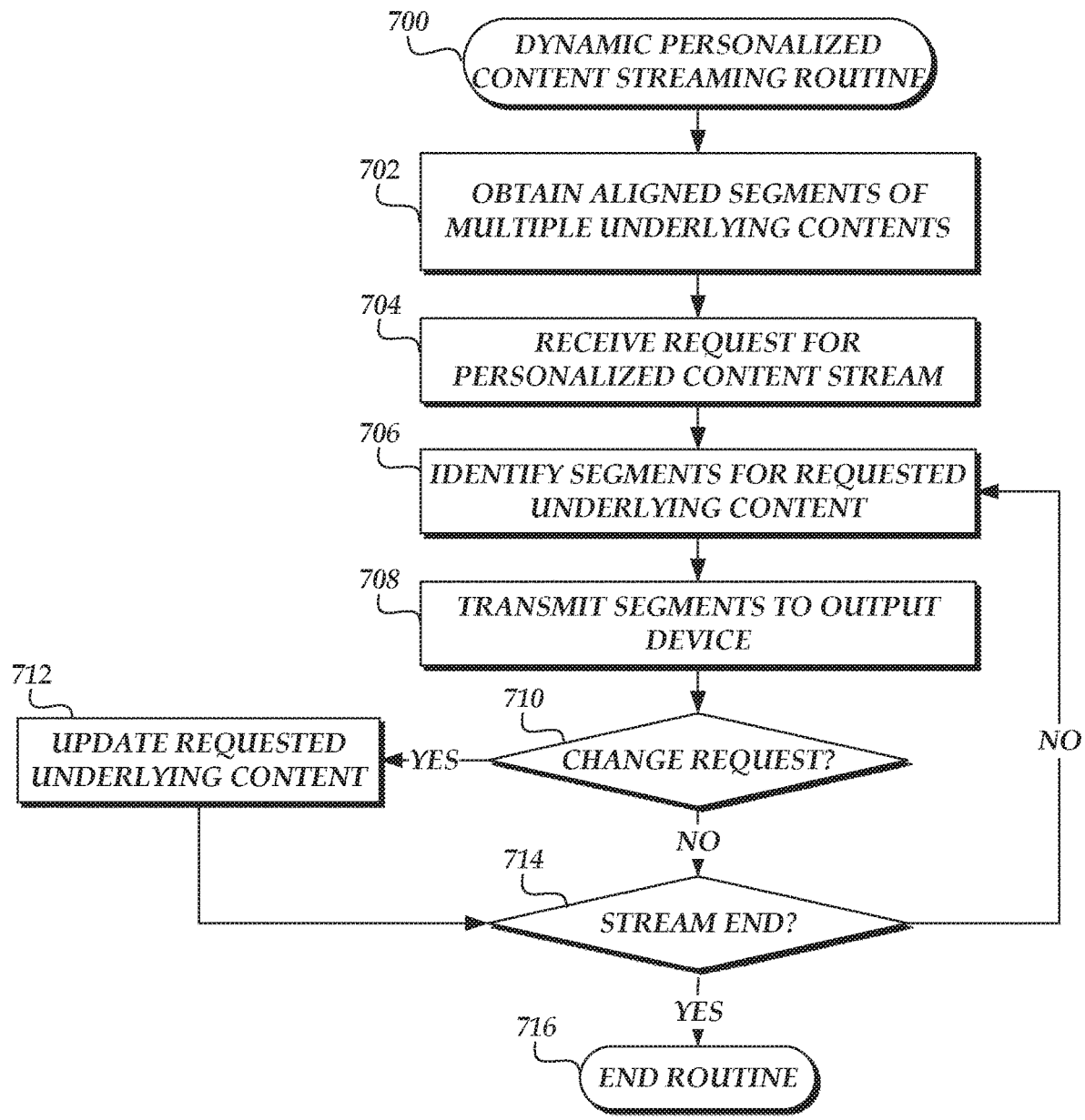
FIG. 7 is a flow chart depicting an illustrative routine for providing personalized content streams including segments representing multiple underlying contents.

With reference to FIG. 7, one illustrative routine 700 will be described for providing a dynamic personalized content stream. The routine 700 may be implemented, for example, by the streaming content delivery system 110 of FIG. 1.

The routine 70 begins at block 702, where the streaming content delivery system 110 obtains segments of multiple underlying contents with aligned splice point frames. In one embodiment, the segments may be provided to the streaming content delivery system 110 (e.g., by content provider computing devices 108). In another embodiment, the streaming content delivery system 110 may obtains segments of multiple underlying contents with aligned splice point frames by processing multiple input content streams to generate segments of each input content stream with aligned splice point frames, as discussed above.

Thereafter, at block 704, the streaming content delivery system 110 receives a request for a personalized content stream. The request may be transmitted, for example, by an output computing device 102, and may indicate a first underlying content to be included within the personalized content stream.

At block 706, the streaming content delivery system 110 identifies segments for the personalized content stream according to a currently requested underlying content (e.g., as indicated within the initial request for the personalized content stream). Illustratively, the streaming content delivery system 110 may identify one or more segments generated based on an input content stream identified within the request for a personalized content stream.

At block 708, the streaming content delivery system 110 transmits the identified segments to the output computing device 102. In one embodiment, the identified segments may be transmitted based at least partly on referencing the segments within manifest data. In another embodiment, the segments may be transmitted based at least partly on inclusion of placeholder references within manifest data, and on resolution of a placeholder reference at the streaming content delivery system 110 into a reference for an identified segment.

At block 710, the routine 700 may vary based on whether a request to change the underlying content of the personalized content stream has been received. If so, the routine 700 proceeds to block 712, where the streaming content delivery system 110 updates the requested underlying content within the personalized content stream. For example, the streaming content delivery system 110 may record within memory an indication that the personalized content stream should be modified to include a different underlying content. The routine 700 then proceeds to block 714. If no request to change underlying content is received, the routine 700 may proceed directly from block 710 to block 714.

At block 714, the routine 700 may vary based on whether the personalized content stream has ended (e.g., if a user has requested that the personalized content stream end, if a current underlying content of the stream has ended, etc.). If so, the routine 700 proceeds to block 716 and ends. Otherwise, the routine 700 returns to block 706, where the streaming content delivery system 110 again identifies underlying segments for a currently requested underlying content at block 706 and causes the segments to be transmitted to the output device, at block 708, as described above. The routine 700 may continue in this manner, thus enabling a user to dynamically alter the content of a personalized content stream.

While one illustrative example of a routine 700 is described above, the elements or ordering of elements in the routine 700 may vary across embodiments of the present disclosure. For example, in some instances, block 712 may function as a separate routine, or as an "interrupt" to the routine 700, such that the requested underlying content may be altered at any time during execution of the routine 700. Other modifications or alterations will be apparent to one of skill in the art in view of the present disclosure. Thus, the elements and ordering of the routine 700 are intended to be illustrative in nature.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for providing personalized content streams created from a user-selected combination of input content streams, the system comprising:
   one or more encoding computing devices configured with computer-executable instructions to:
   obtain at least two input content streams;
   encode the at least two input content streams into at least two encoded content streams, the at least two encoded content streams including one or more splice point frames at common locations between the at least two encoded content streams, each splice point frame ensuring that no inter frame dependency exists between one or more frames prior to the splice point frame and one or more frames subsequent to the splice point frame;
   generate a first set of content segments from a first encoded content stream of the at least two encoded content streams that represents a first underlying content, wherein each segment of the first set of content segments begins from a location in the first encoded content stream corresponding to a splice point frame; and
   generate a second set of content segments from a second encoded content stream of the at least two encoded content streams that represents a second underlying content, wherein each segment of the second set of content segments begins from a location in the second encoded content stream corresponding to a splice point frame;
   a data store configured to store the first set of content segments and the second set of content segments; and
   one or more computing devices configured with computer-executable instructions to:
   receive a request for a personalized content stream, the request identifying the first underlying content;
   transmit manifest data for the personalized content stream including a set of placeholder references, the placeholder references associated with mutable mapping information that is maintained at the one or more computing devices separately from the manifest data, wherein the mutable mapping information, at a point in time when the manifest data is transmitted, maps individual placeholder references of the set of placeholder references to individual segments of the first set of content segments;
   respond to individual requests to obtain content identified by a given placeholder reference of the set of placeholder references at least partly by:
   identifying a content segment that is, at a current point in time, mapped to the given placeholder reference within the mutable mapping information; and
   transmitting the content segment that is, at the current point in time, mapped to the given placeholder reference within the mutable mapping information as a portion of the personalized content stream;
   receive a request to modify the personalized content stream to include the second underlying content; and
   modify the mutable mapping information, as maintained at the one or more computing devices separately from the manifest data, to map individual placeholder references of the set of placeholder references included within the transmitted manifest data to individual segments of the second set of content segments;
   wherein prior to modification of the mutable mapping information, the one or more computing devices are configured to respond to requests to obtain content identified by individual placeholder references included within the transmitted manifest data by transmitting content segments of the first set of content segments; and
   wherein modification of the mutable mapping information configures the one or more computing devices to respond to subsequent requests to obtain content identified by individual placeholder references included within the transmitted manifest data by transmitting content segments of the second set of content segments.

2. The system of claim 1, wherein the first encoded content stream is live streaming content.

3. The system of claim 1, wherein the first underlying content represents a first view of a common event, and where the second underlying content represents a second view of the common event.

4. The system of claim 1, wherein the first and second encoded content streams are encoded according to the H.264 standard, and wherein the splice point frames are Instantaneous Decoder Refresh ("IDR") frames.

5. A computer-implemented method comprising:
   generating, from a first input content stream representing a first underlying content, a first set of content segments, wherein each segment of the first set of content segments begins from a location in the first input content stream corresponding to a splice point frame each splice point frame ensuring that no inter frame dependency exists between one or more frames prior to the splice point frame and one or more frames subsequent to the splice point frame;
   generating, from a second input content stream representing a second underlying content, a second set of content segments, wherein each segment of the second set of content segments begins from a location in the second input content stream corresponding to a splice point frame, and where each segment of the second set of content segments is time-aligned with a corresponding segment of the first set of content segments;
   receiving a request for a personalized content stream, the request identifying the first underlying content;
   transmitting manifest data for the personalized content stream including a set of placeholder references, the placeholder references associated with mutable mapping information that is maintained separately from the manifest data, wherein the mutable mapping information, at a point in time when the manifest data is transmitted, maps individual placeholder references of the set of placeholder references to individual segments of the first set of content segments;
   at least two distinct points in time, responding to individual requests to obtain content identified by a given placeholder reference of the set of placeholder references at least partly by:
   identifying a content segment that is, at a current point in time, mapped to the given placeholder reference within the mutable mapping information; and
   transmitting the content segment that is, at the current point in time, mapped to the given placeholder reference within the mutable mapping information as a portion of the personalized content stream;
   receiving a request to modify the personalized content stream to include the second underlying content; and modifying the mutable mapping information, as maintained separately from the manifest data, to map individual placeholder references of the set of placeholder references included within the transmitted manifest data to individual segments of the second set of content segments;

wherein a first point in time of the at least two distinct points in time occurs prior to modifying the mutable mapping information, and wherein responding to an individual request received at the first point in time comprises transmitting a content segment of the first set of content segments; and wherein a second point in time of the at least two distinct points in time occurs subsequent to modifying the mutable mapping information, and wherein responding to an individual request received at the second point in time comprises transmitting a content segment of the second set of content segments.

6. The computer-implemented method of claim 5, wherein the first set of content segments represents at least one of audio or video content.

7. The computer-implemented method of claim 5, wherein the request to modify the personalized content stream is received from a view selection computing device, and wherein the computer-implemented method further comprises transmitting to the view selection computing device graphical representations of the first and second underlying contents.

8. The computer-implemented method of claim 7, wherein the graphical representations are thumbnail images.

9. The computer-implemented method of claim 7, wherein the graphical representations are low-resolution video streams.

10. The computer-implemented method of claim 5, wherein the first set of content segments are packaged within a plurality of containers generated in accordance with at least one of Hypertext Transport Protocol ("HTTP") Live Streaming ("HLS") protocol or MPEG Dynamic Adaptive Streaming over HTTP ("MPEG-DASH") protocol.

11. The computer-implemented method of claim 5, wherein the first and second input content streams are Moving Picture Experts Group Transport Streams ("MPEG-TSs").

12. A system for providing personalized content streams created from a user-selected combination of input content streams, the system comprising:
  a data store including:
    a first set of content segments representing a first underlying content, wherein each segment of the first set of content segments begins from a location in the first underlying content corresponding to a splice point frame each splice point frame ensuring that no inter frame dependency exists between one or more frames prior to the splice point frame and one or more frames subsequent to the splice point frame; and
    a second set of content segments representing a second underlying content, wherein each segment of the second set of content segments begins from a location in the second underlying content corresponding to a splice point frame, and where each segment of the second set of content segments is time-aligned with a corresponding segment of the first set of content segments;
  one or more computing devices configured with computer-executable instructions to:
    receive a request for a personalized content stream, the request identifying the first underlying content;
    transmit manifest data for the personalized content stream including a set of placeholder references, the placeholder references associated with mutable mapping information that is maintained, at the one or more computing devices, separately from the manifest data, wherein the mutable mapping information, at a point in time when the manifest data is transmitted, maps individual placeholder references of the set of placeholder references to individual segments of the first set of content segments;
    respond to individual requests to obtain content identified by a given placeholder reference of the set of placeholder references at least partly by:
      identifying a content segment that is, at a current point in time, mapped to the given placeholder reference within the mutable mapping information; and
      transmitting the content segment that is, at the current point in time, mapped to the given placeholder reference within the mutable mapping information as a portion of the personalized content stream;
    receive a request to modify the personalized content stream to include the second underlying content; and
    modify the mutable mapping information, as maintained at the one or more computing devices separately from the manifest data, to map individual placeholder references of the set of placeholder references included within the transmitted manifest data to individual segments of the second set of content segments.

13. The system of claim 12 further comprising an encoding computing system configured with computer-executable instructions to generate the first and second sets of content segments from respective first and second input content streams.

14. The system of claim 12, wherein the request to modify the personalized content stream is received from a view selection computing device, and wherein the one or more computing devices are further configured with the computer-executable instructions to transmit to the view selection computing device graphical representations of the first and second underlying contents.

15. The system of claim 14, wherein personalized content stream is output on an output computing device, and wherein the output computing device is a different device than the view selection computing device.

16. The system of claim 14, wherein personalized content stream is output on the view selection computing device.

17. The system of claim 12, wherein the request to modify the personalized content stream is received from a view selection computing device, and wherein the view selection computing device transmits the request to modify the personalized content stream in response to an input from a user, the input including one or more of selection of a graphical representation of the first and second underlying contents, modification of an orientation of the view selection computing device, or selection of a physical input on the view selection computing device.

* * * * *